(12) United States Patent
Memmott

(10) Patent No.: US 6,536,669 B2
(45) Date of Patent: Mar. 25, 2003

(54) METHOD OF COMPONENTIZING AN INVENTORY SCANNER AND PROVIDING A PLUG-IN ARCHITECTURE

(75) Inventor: James Lester Memmott, Pleasant Grove, UT (US)

(73) Assignee: Intel Corporation, Santa Clara, CA (US)

( * ) Notice: Subject to any disclaimer, the term of this patent is extended or adjusted under 35 U.S.C. 154(b) by 73 days.

(21) Appl. No.: 09/741,399

(22) Filed: Dec. 19, 2000

(65) Prior Publication Data

US 2002/0077913 A1 Jun. 20, 2002

(51) Int. Cl.⁷ ................................................. G06K 7/10
(52) U.S. Cl. ............................. 235/472.01; 235/472.02
(58) Field of Search ........................ 235/472.01, 472.02

(56) References Cited

U.S. PATENT DOCUMENTS 6,467,052 B1 * 10/2002 Kaler et al. ............ 235/472.01

* cited by examiner

Primary Examiner—Harold I. Pitts
(74) Attorney, Agent, or Firm—Blakely, Sokoloff, Taylor & Zafman LLP

(57) ABSTRACT

A computer system having an inventory scanner with an architecture comprising a plurality of mini-scanners to provide data regarding components in a computer system and a coordinator to gather data from the plurality of mini-scanners and report a data stream of the information from the plurality of mini-scanners.

19 Claims, 4 Drawing Sheets

METHOD OF COMPONENTIZING AN INVENTORY SCANNER AND PROVIDING A PLUG-IN ARCHITECTURE

FIELD OF THE INVENTION

The present invention relates to the field of computer systems; more particularly, the present invention relates to computer systems that employ inventory scanners using a plug-in architecture.

BACKGROUND OF THE INVENTION

An inventory scanner is a well-known component that reports the hardware and software configuration of the system. This component has traditionally been implemented as a single executable monolithic binary, or file, that runs on a particular system, which attempts to discover information relating to items such as processors, networking information (e.g., Transmission Control Protocol/Internet Protocol (TCP/IP) address, Media Access Controller (MAC) address, network interface card (NIC) speed, Dynamic Host Configuration Protocol (DHCP) settings, hose name, host domain, etc.), printers, processes, modems, machine configuration, operating system (OS) configuration, application configuration, etc.

A problem exists in that as a computer system is upgraded to include different or additional hardware or software components, the single monolithic binary must be changed if it is to provide information on the new components. However, it is difficult, if not impractical, to generate a new monolithic binary everytime new hardware or software is made available for inclusion in a system so that an inventory scanner could be used to provide information on that hardware or software.

Furthermore, as third parties develop new software or hardware components, they often want to have their components plugged into an existing system. However, an inventory scanner running on the system may not be able to provide any information on the new component because the monolithic binary is not written to recognize the component. This is the case even if the third party has a binary that may be used for that purpose.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
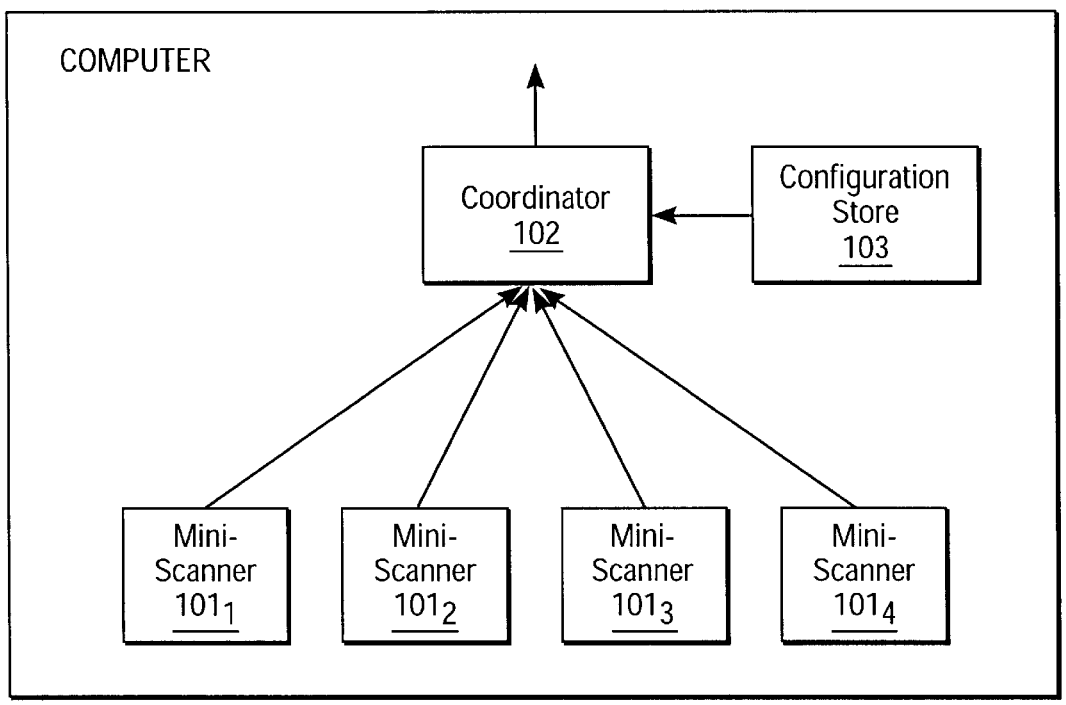
FIG. 1 is a block diagram of components and information flow in an inventory scanner.

An inventory scanner is described. A computer system having an inventory scanner with an architecture comprising a plurality of mini-scanners to provide data regarding components in a computer system and a coordinator to gather data from the plurality of mini-scanners and report a data stream of the information from the plurality of mini-scanners. The architecture allows inventory data providers to plug-in into a common framework.

In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

An inventory scanner architecture is described herein which is componentized and allows third parties to plug-in their own data providing components. FIG. 1 is a block diagram of components and information flow in an inventory scanner. Referring to FIG. 1, mini scanners $101_1$–$101_N$ provide information to coordinator 102. Mini scanners $101_1$–$101_N$ may report, for example, processor information (e.g., the type of processor in a system, processor speed, instruction type(s) used, presence of a math co-processor or digital signal processor, whether a central processing unit (CPU) ID feature is being used, etc.), hard drive or other memory information (e.g., presence of a type of memory, memory size, available space, used space in the memory, etc.), software configuration (e.g., ODBC, certain drivers present), printer information, auditor information, video card information, temperature information (e.g., chassis temperature, processor temperature, motherboard temperature), etc.

A third party could provide a mini-scanner in the form of a binary that could be integrated into the inventory scanner architecture described herein without requiring the user of the inventory scanner to know how that binary is performing its function.

In one embodiment, each of the mini-scanners $101_1$–$101_N$ is implemented as a stand-alone application that runs in its own process space from coordinator 102 and reports data by sending it to stdout encoded in a BNF format, with success being indicated by returning 0, and failure being indicated by any non-zero value.

Mini-scanners $101_1$–$101_N$ and coordinator 102 work together in a constructive manner. When running, coordinator 102 polls each of mini-scanners $101_1$–$101_N$ in a predetermined order or randomly and gathers the information from mini scanners $101_1$–$101_N$. Coordinator 102 may operate at one or more preselected times or one or more periodic intervals. For example, coordinator 102 may run at boot time. Alternatively, coordinator 102 may gather the information in response to a request from a server.

Thereafter, coordinator 102 reports the information received from mini-scanners $101_1$–$101_N$. In one embodiment, coordinator 102 reports the information to a sever that is external to the client running the inventory scanner. Such a server may be a control database server. Alternatively, the information may be provided to an application for viewing by a user or stored in a file for access or use in the future.

In one embodiment, coordinator 102 reports the information by concatinating the information from mini-scanners $101_1$–$101_N$ into a single data stream. In the case of conflicting information being provided by minis-canners $101_1$–$101_N$, in one embodiment, coordinator 102 may resolve the conflict and changing the information provided by a mini-scanner (providing the incorrect information) or taking such information out of the data stream provided by that mini-scanner. The use of priority among mini-scanners $101_1$–$101_N$ may be used to resolve such information collisions.

Coordinator 102 also receives information from configuration store 103.

In one embodiment, the operations of each of mini-scanners $101_1$–$101_N$, coordinator 102 and configuration store 103 is performed by processing logic that may comprise hardware (e.g., circuitry, dedicated logic, etc.), software (e.g., software running on a general purpose computer system or a dedicated machine, etc.), or a combination of both.

Figure 2:
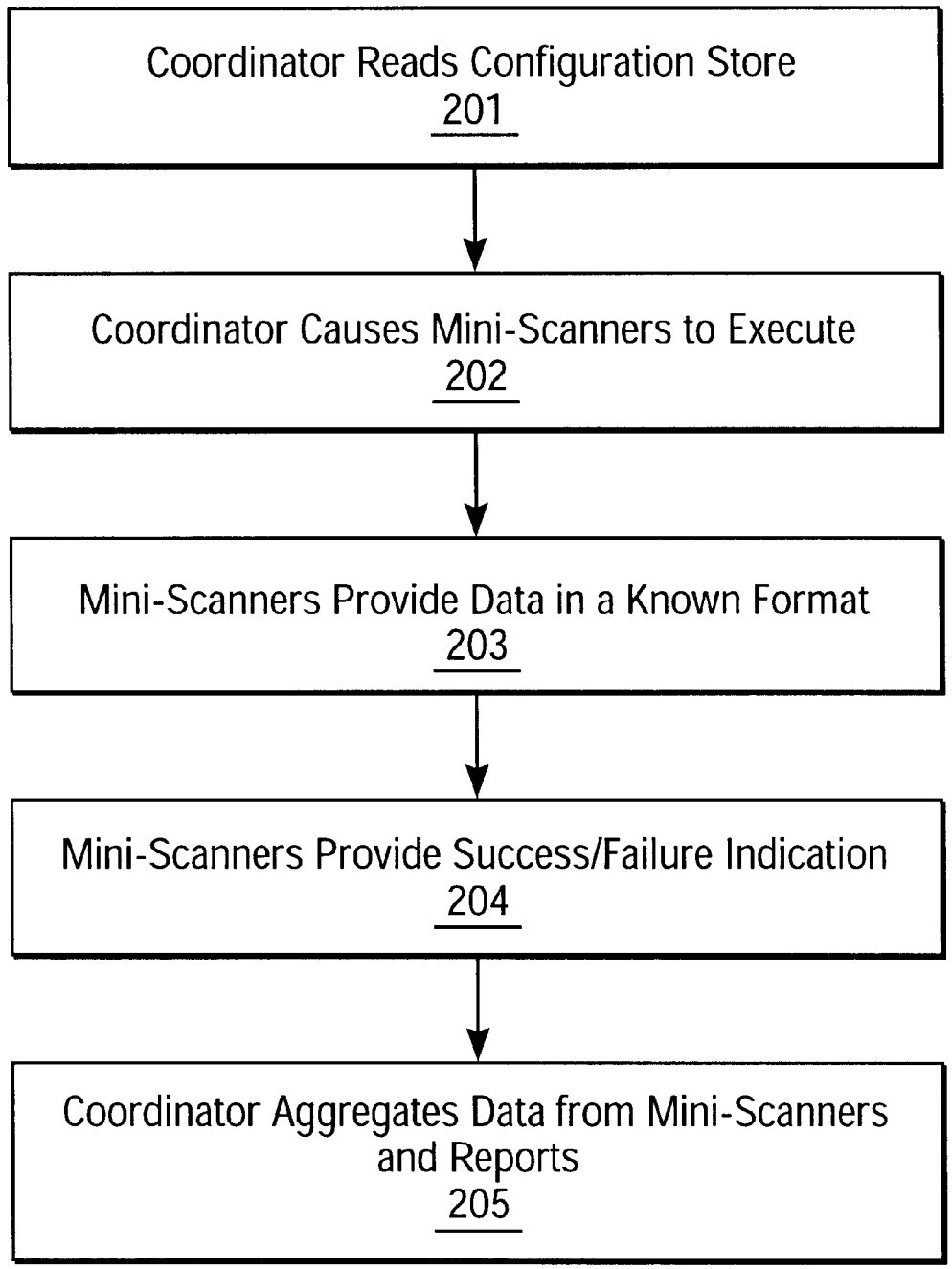
FIG. 2 is a flow diagram of one embodiment of a process for gathering information using an inventory scanner.

FIG. 2 is one embodiment of a process for performing data gathering using the architecture described herein. Referring to FIG. 2, coordinator 102, as a process, initially reads configuration store 103 (processing block 201) to determine what mini-scanners are to be run and an application path to the binary to trigger these binaries to execute. Configuration store 103 may also include parameters to pass to a particular mini-scanner.

After reading configuration store 103, coordinator 102 proceeds to execute each mini-scanner $101_1$–$101_N$ in turn (processing block 202). Each of mini-scanners $101_1$–$101_N$ writes its data to a known location (processing block 203). Such a known output location may be stdout (i.e., standard out), which is well-known in the art. Alternatively, mini-scanners $101_1$–$101_N$ may write their data to stderr (standard error), a file, a TCP/IP socket, etc. In one embodiment, each of mini-scanners $101_1$–$101_N$ also returns an indication to indicate whether it ran successfully or whether it failed (processing block 204). For example, a mini-scanner may return a 0 value if it ran successfully and a non-zero value if it failed.

In one embodiment, the information is encoded using Backus-Naur Form (BNF). The information from coordinator 102 could be encoded in other formats (e.g., extensible markup language (XML), comma separated values (CSV), etc.).

In response to the data from mini-scanners $101_1$–$101_N$ coordinator 102 aggregates the data by concatenating the results from each mini-scanner and outputs to stdout (processing block 205). Alternatively, coordinator 102 may perform data correlation to group related information from each mini-scanner together. For example, all the information regarding processors in a system may be grouped together and then provided to a server.

Coordinator 102 may also return an indication (e.g., 0 on success, non-zero on failure) to the server, application, etc., making the request to indicate performance status.

Configuration store 103 is an extensible storage device that allows a third party application to add their own mini-scanners. Third parties add information to configuration store 103 about a new mini-scanner. The next time coordinator 102 runs, coordinator 102 recognizes the new information and acts on it. This gives the architecture a plug-in ability. In one embodiment, configuration store 103 contains the following configuration items for each of mini-scanners $101_1$–$101_N$: VitalBit, Wait Time, Application, and CmdParams.

Figure 3:
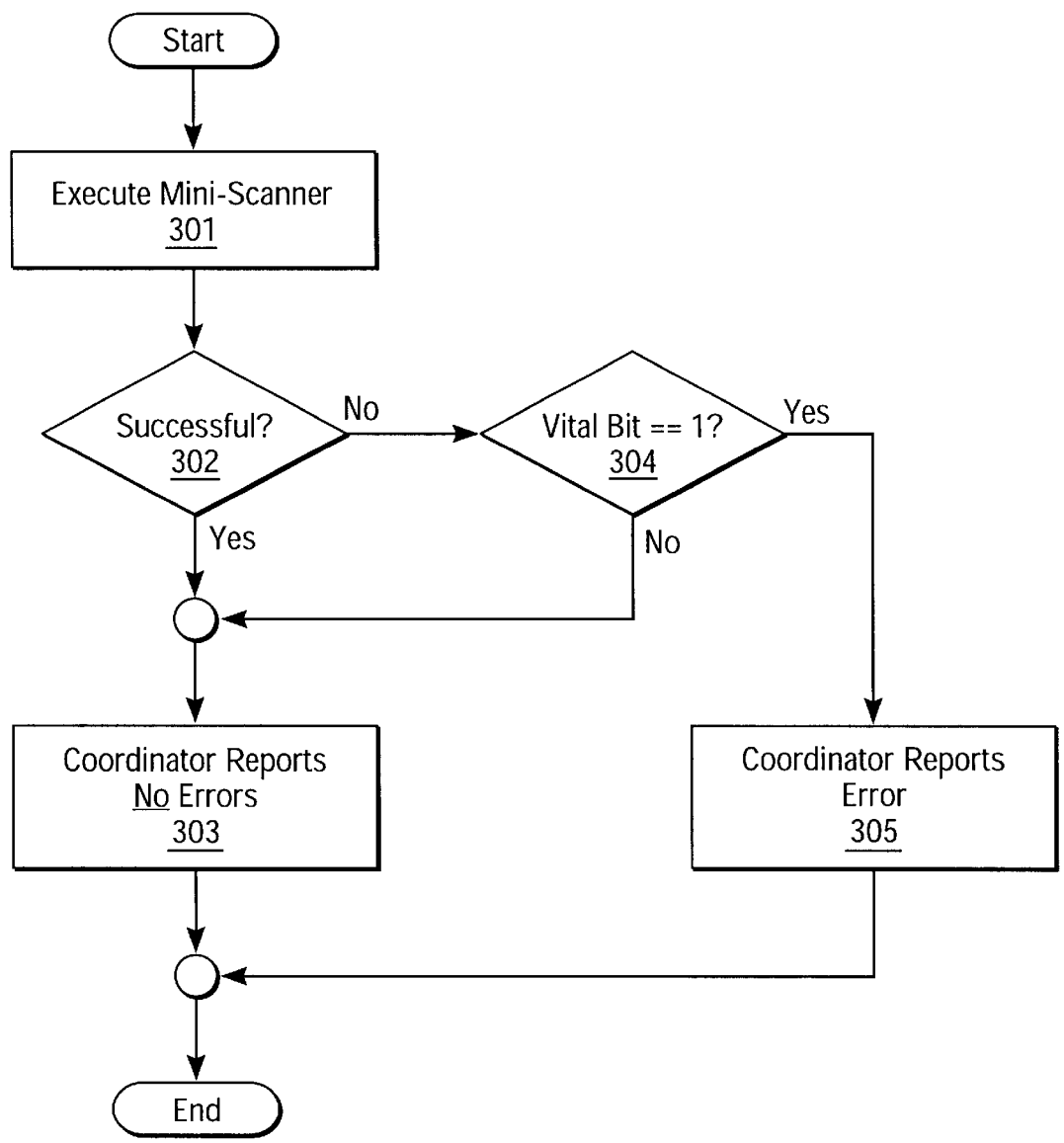
FIG. 3 is a flow diagram of one embodiment of a process for using a VitalBit to control processing.

If the VitalBit ==1 and the corresponding mini-scanner fails to run successfully, coordinator 102 stops running and reports a failure to the requester (e.g., server, calling application, file, etc.). If the VitalBit==0, coordinator 102 continues to run to the next mini-scanner even if the current mini-scanner fails. FIG. 3 is a flow diagram of one embodiment of a process for using the VitalBit. Referring to FIG. 3, processing logic initially executes a mini-scanner (processing block 301). Processing logic then tests whether execution of the mini-scanner was successful (processing block 302). If execution was successful, processing transitions to processing block 303 where processing logic in the coordinator provides an indication that there were no errors (e.g., the coordinator reports no errors have occurred). Thereafter the process ends. On the other hand, if execution was not successful, then processing logic tests whether the VitalBit is set equal to 1 (processing block 304), indicating that failed execution of the mini-scanner causes coordinator termination. If processing logic determines that the VitalBit is not set to 1, the processing transitions to processing block 303; otherwise, processing transitions to processing block 305 where processing logic in the coordinator reports an error to a predetermined location (e.g., a server, file, application, etc.). Thereafter, the process ends.

WaitTime is the maximum amount of time to wait for the mini-scanner to complete. If this time is exceeded before the current mini-scanner completes, coordinator 102 goes on to the next mini-scanner. If this is the case, any information received from the mini-scanner prior to moving to the next mini-scanner is ignored. Alternatively, this information may be used.

The application is the path to the mini-scanner binary (e.g., /home/bob/mini-scanner).

The CmdParams is optional and specifies any command-line parameters that are to be passed to the mini-scanner when it is launched. For example, such a parameter may indicate where in a file directory a mini-scanner is to start tranversing to determine if a particular software is being stored on the client. Also, a parameter could control how much information is reported.

The invention scanner architecture could be implemented with other technologies such as, for example, DLL (dynamically loadable modules), shared objects, Component Object Model (COM), CORBA, etc., by varying the interface (as opposed to stdin and stdout) to match the technology used. For example, other implementations may generate TCP streams or use pipes to transport the information.

There are a number of advantages to the approach described herein. For example, the componentized nature of the architecture allows small pieces of software to be fixed or upgraded rather than a large piece (e.g., the monolithic scanner). For example, by managing the configuration store, an additional mini-scanner could be added. The componentized nature also simplifies coding and debugging by putting individual components into its own independent component (e.g., mini-scanner) and allows small pieces of code (or functionality) to be reused in other places, even in places where requirements might differ. For example, better performance could be achieved with a small reusable component rather than having to reload a large monolithic component if the interested application only wants a subset of the data.

The architecture is also advantageous in that it allows third parties to integrate their own data-discovering components as plug-ins even after the initial "scanner" is installed. This may be done in a two-step process. First, any necessary binaries are installed. Then the configuration store is updated so that the coordinator becomes aware of any new mini-scanners.

Figure 4:
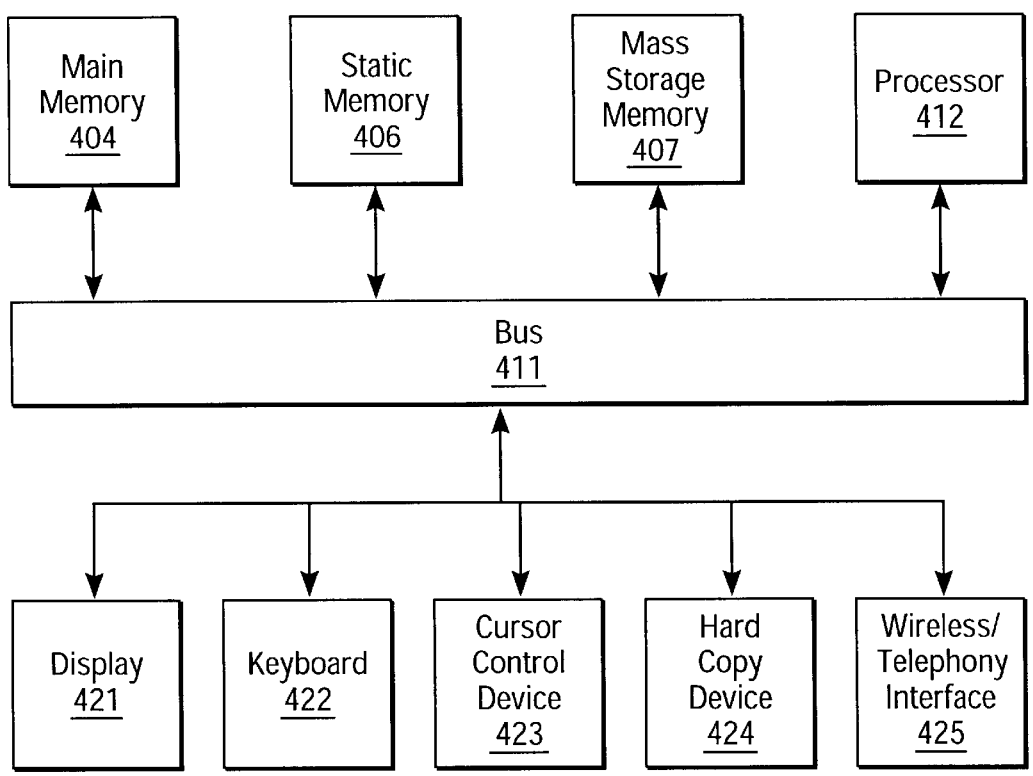
FIG. 4 is a block diagram of one embodiment of a computer system.

FIG. 4 is a block diagram of an exemplary computer system that may perform one or more of the operations described herein. Referring to FIG. 4, computer system 400 may comprise an exemplary client 450 or server 400 computer system. Computer system 400 comprises a communication mechanism or bus 411 for communicating information, and a processor 412 coupled with bus 411 for processing information. Processor 412 includes a microprocessor, but is not limited to a microprocessor, such as, for example, Pentium™, PowerPC™, Alpha™, etc.

System 400 further comprises a random access memory (RAM), or other dynamic storage device 404 (referred to as main memory) coupled to bus 411 for storing information and instructions to be executed by processor 412. Main memory 404 also may be used for storing temporary variables or other intermediate information during execution of instructions by processor 412.

Computer system 400 also comprises a read only memory (ROM) and/or other static storage device 406 coupled to bus 411 for storing static information and instructions for processor 412, and a data storage device 407, such as a magnetic disk or optical disk and its corresponding disk drive. Data storage device 407 is coupled to bus 411 for storing information and instructions.

Computer system 400 may further be coupled to a display device 421, such as a cathode ray tube (CRT) or liquid crystal display (LCD), coupled to bus 411 for displaying information to a computer user. An alphanumeric input device 422, including alphanumeric and other keys, may also be coupled to bus 411 for communicating information and command selections to processor 412. An additional user input device is cursor control 423, such as a mouse, trackball, trackpad, stylus, or cursor direction keys, coupled to bus 411 for communicating direction information and command selections to processor 412, and for controlling cursor movement on display 421.

Another device that may be coupled to bus 411 is hard copy device 424, which may be used for printing instructions, data, or other information on a medium such as paper, film, or similar types of media. Furthermore, a sound recording and playback device, such as a speaker and/or microphone may optionally be coupled to bus 411 for audio interfacing with computer system 400. Another device that may be coupled to bus 411 is a wired/wireless communication capability 425 to communication to a phone or handheld palm device.

Note that any or all of the components of system 400 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. An inventory scanner for use in a computer system, the inventory scanner comprising:
   a plurality of mini-scanners to provide data regarding components in the computer system; and
   a coordinator to aggregate data from the plurality of mini-scanners and report a data stream of the information from the plurality of mini-scanners.

2. The inventory scanner defined in claim 1 wherein the coordinator creates the data stream by concatenating the data from the plurality of mini-scanners.

3. The inventory scanner defined in claim 1 wherein the coordinator causing execution of each of the plurality of mini-scanners to gather the data.

4. The inventory scanner defined in claim 1 further comprising a configuration store accessible by the coordinator to indicate to the coordinator a path to a binary for each of the plurality of mini-scanners.

5. The inventory scanner defined in claim 4 wherein the configuration store maintains information for each mini-scanner that specifies whether the coordinator is to stop running or continue to another of the plurality of mini-scanners if one of the plurality of mini-scanner fails to run successfully.

6. The inventory scanner defined in claim 4 wherein the configuration store indicates maximum amounts of time for the coordinator to wait for each of the plurality of mini-scanners to complete.

7. The inventory scanner defined in claim 1 wherein each of the plurality of mini-scanners formats the data prior to sending the data to the coordinator.

8. The inventory scanner defined in claim 7 wherein the format in Backus-Naur Form (BNF).

9. The inventory scanner defined in claim 1 wherein the coordinator reports the data stream to a server.

10. A method for performing an inventory scanner operation comprising:
   a coordinator causing execution of a plurality of mini-scanners to provide data regarding components in the computer system;
   the coordinator aggregating data from the plurality of mini-scanners; and
   reporting aggregated data from the plurality of mini-scanners.

11. The method defined in claim 10 wherein the coordinator aggregating the data comprises concatenating the data from the plurality of mini-scanners into a single data stream.

12. The method defined in claim 10 further comprising accessing a configuration store to obtain a path to a binary for each of the plurality of mini-scanners.

13. The method defined in claim 12 further comprising storing in the configuration store information for each mini-scanner that specifies whether the coordinator is to stop running or continue to another of the plurality of mini-scanners if one of the plurality of mini-scanner fails to run successfully.

14. The method defined in claim 12 further comprising storing in the configuration store indications as to maximum amounts of time for the coordinator to wait for each of the plurality of mini-scanners to complete.

15. The method defined in claim 10 further comprising each of the plurality of mini-scanners formatting the data prior to sending the data to the coordinator.

16. The method defined in claim 15 wherein the format in Backus-Naur Form (BNF).

17. The method defined in claim 10 wherein the coordinator reports the data stream to a server.

18. An article of manufacture having at least one recordable medium to store executable instructions which, when executed by a processor, cause the processor to:
   execute a plurality of mini-scanners to provide data regarding components in the computer system;
   aggregate data from the plurality of mini-scanners into a single data stream; and
   report the data stream of the information from the plurality of mini-scanners.

19. The article of manufacture defined in claim 18 wherein instructions when executed cause the processor to concatenate the data from the plurality of mini-scanners.

* * * * *

UNITED STATES PATENT AND TRADEMARK OFFICE
CERTIFICATE OF CORRECTION

PATENT NO.    : 6,536,669 B2
DATED         : March 25, 2003
INVENTOR(S)   : Memmott It is certified that error appears in the above-identified patent and that said Letters Patent is hereby corrected as shown below:

<u>Column 3,</u>
Line 65, delete "minis-canners", insert -- mini-scanners --.

<u>Column 5,</u>
Line 28, delete "mini-scanner", insert -- myminiscanner --.

Signed and Sealed this

Eighth Day of July, 2003

JAMES E. ROGAN
*Director of the United States Patent and Trademark Office*